United States Patent [19]
Grogan

[11] 4,426,563
[45] Jan. 17, 1984

[54] CHAIN SAW SAFETY SWITCH

[75] Inventor: Victor A. Grogan, R.D. #1 Hayes Rd., Schaghticoke, N.Y. 12154

[73] Assignees: Victor A. Grogan; Hope Grogan, both of Schaghticoke; Walter F. Wessendorf, Jr., Guilderland, all of N.Y.

[21] Appl. No.: 475,254

[22] Filed: Mar. 14, 1983

[51] Int. Cl.³ .............................................. H01H 9/20
[52] U.S. Cl. .................... 200/334; 200/157; 30/383
[58] Field of Search .............. 200/157, 329, 330, 331, 200/334, 336, 291, 337, 338, 161; 30/381–384

[56] References Cited

U.S. PATENT DOCUMENTS

| | | | |
|---|---|---|---|
| 2,519,215 | 8/1950 | Appleton et al. | 200/157 X |
| 3,131,277 | 4/1964 | Brenzen | 200/157 |
| 3,293,382 | 12/1966 | Lewandowski et al. | 200/291 X |
| 3,311,728 | 3/1967 | Brenzen | 200/157 |
| 3,664,390 | 5/1972 | Mattson et al. | 30/381 |
| 3,776,331 | 12/1973 | Gustafsson | 30/381 |
| 3,793,727 | 2/1974 | Moore | 30/383 |
| 3,823,616 | 7/1974 | Houseman et al. | 200/157 |
| 3,934,345 | 1/1976 | Hirschkoff | 30/381 |
| 3,964,333 | 6/1976 | Hirschkoff | 30/381 |
| 3,991,469 | 11/1976 | Frederickson | 30/381 |
| 3,991,864 | 11/1976 | Müller | 30/381 |
| 3,992,779 | 11/1976 | Marks et al. | 30/381 |
| 4,026,392 | 5/1977 | Hirschkoff | 30/381 |
| 4,121,339 | 10/1978 | Nikolich | 30/381 |
| 4,156,477 | 5/1979 | Nagashima et al. | 30/381 |
| 4,167,660 | 9/1979 | Liedtke | 200/157 |
| 4,324,045 | 4/1982 | Höppner et al. | 30/381 |
| 4,334,357 | 6/1982 | Baricevic | 30/381 |
| 4,356,369 | 10/1982 | Hostetler et al. | 200/334 |

Primary Examiner—Stephen Marcus
Assistant Examiner—Ernest G. Cusick
Attorney, Agent, or Firm—Walter F. Wessendorf, Jr.

[57] ABSTRACT

Disclosed is a safety handle that is rotatively mounted on the existing front handle of the chain saw and is operatively connected to the existing on-off switch to independently actuate such switch to shut off the engine and stop the cutting chain upon rotation of such safety handle to its "off" position either automatically when kick-back occurs or upon such rotation by the human operator at his option. A wrist guide struck by the human operator's hand during severe kick-back or when the chain saw is dropped similarly rotates the safety handle to its "off" position. An automatic reset mechanism restores the safety handle to its "on" position after the safety handle has been rotated to its "off" position and released.

9 Claims, 19 Drawing Figures

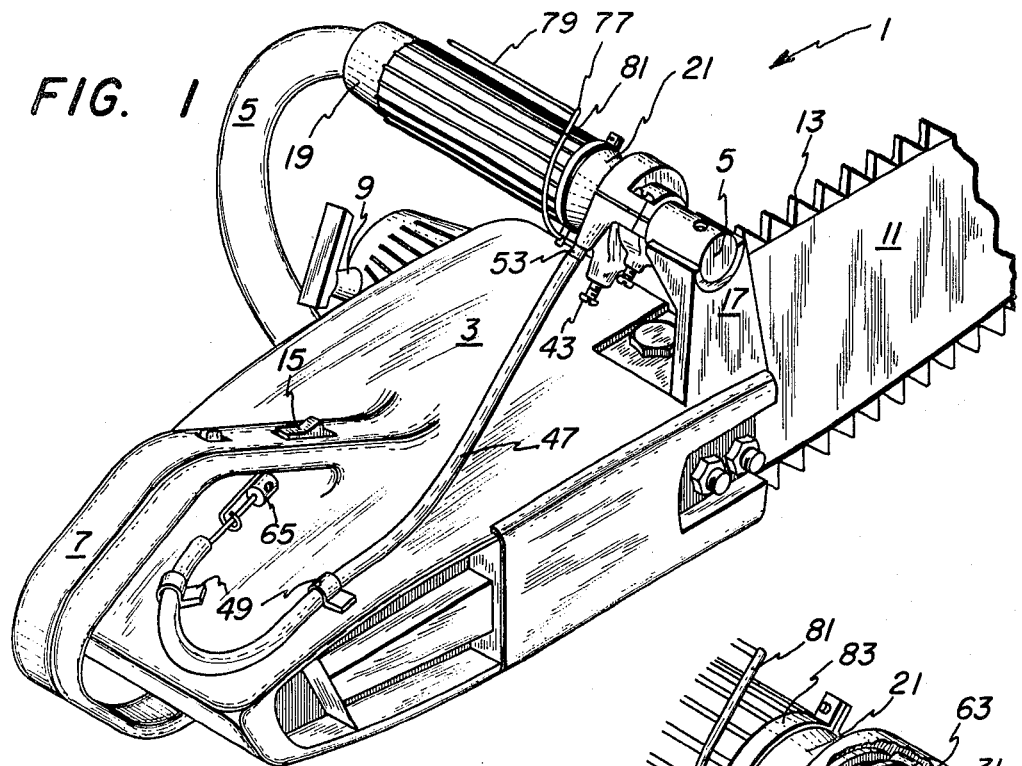
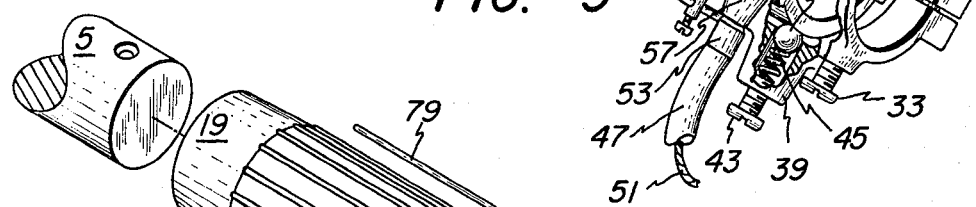
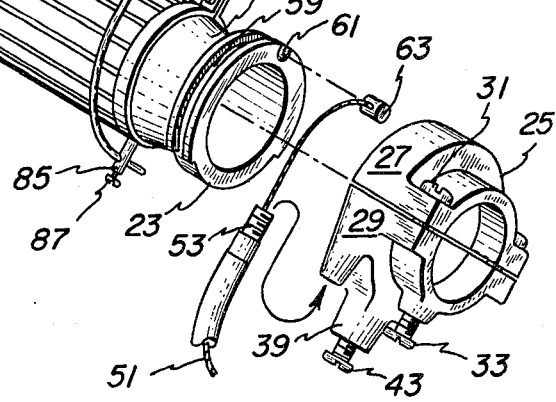

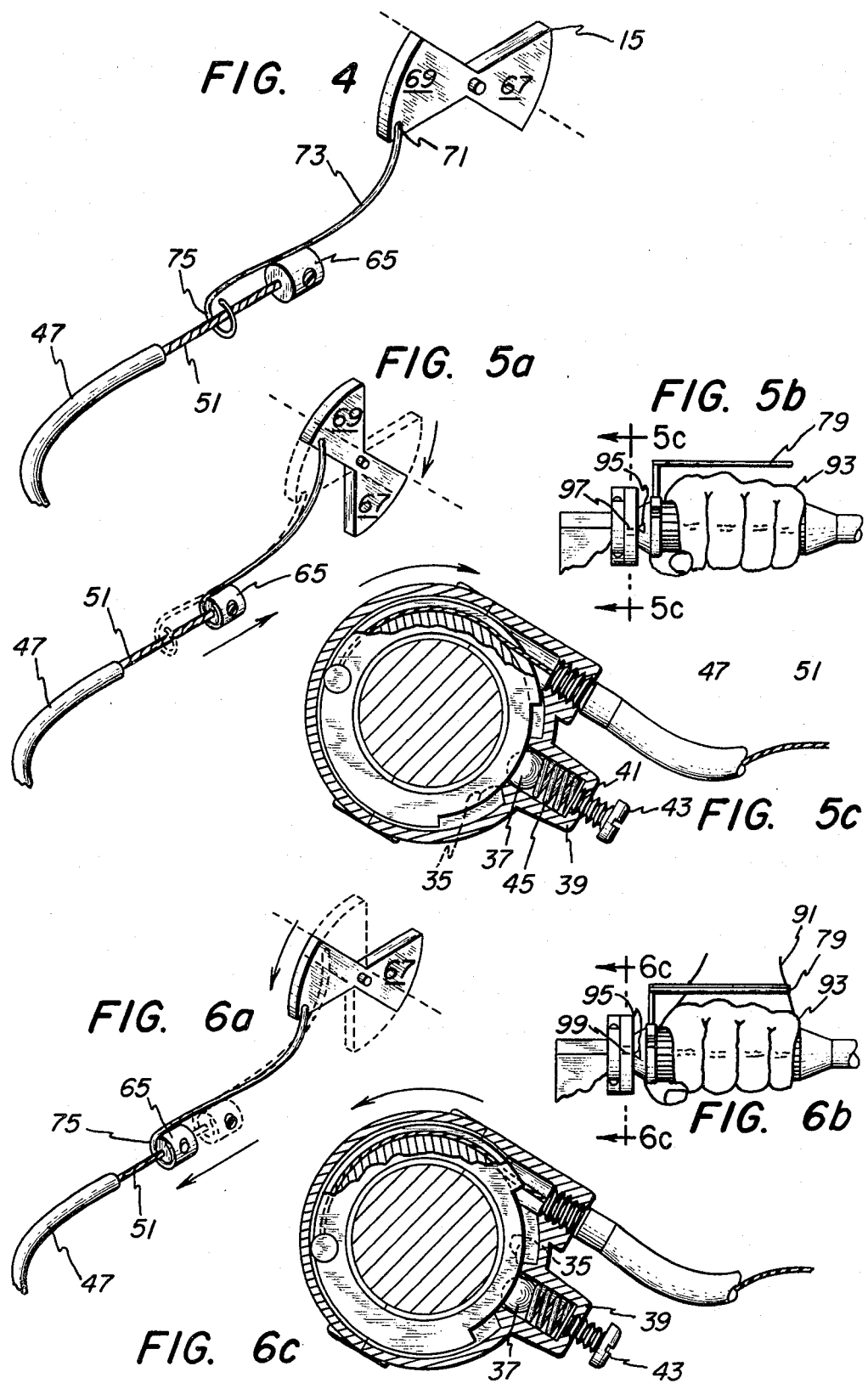

CHAIN SAW SAFETY SWITCH

BACKGROUND OF THE INVENTION

1. Technical Field

This invention relates to a chain saw safety switch that is grasped and held by a human operator during the normal operation of such chain saw and, while so grasped and held, automatically rotates when "kickback" occurs to independently actuate such chain saw's on-off switch that controls the engine driving the cutting chain to stop such cutting chain.

2. Background Art

The prior art, U.S. Pat. No. 3,664,390, discloses safety means for power-driven chain saws; U.S. Pat. No. 3,776,331 discloses a brake-device for power saws; U.S. Pat. No. 3,934,345 discloses a snap-acting over-center chain saw safety brake and method of operation thereof; U.S. Pat. No. 3,964,333 discloses a safety braking mechanism for a portable chain saw; U.S. Pat. No. 3,991,469 discloses a safety braking mechanism for a portable chain saw; U.S. Pat. No. 3,991,864 discloses a motor saw, especially motor chain saw; U.S. Pat. No. 3,992,779 discloses a chain brake for chain saw; U.S. Pat. No. 4,026,392 discloses a snap-acting over-center chain saw safety brake and method of operation thereof; U.S. Pat. No. 4,121,339 discloses a safety brake mechanism for chain saws; U.S. Pat. No. 4,156,477 discloses a braking system of chain saw; U.S. Pat. No. 4,324,045 discloses a motor chain saw with dynamic safety braking device; U.S. Pat. No. 4,334,357 discloses a safety braking apparatus for a portable chain saw.

The following discussion focuses on the problems inherent in the prior art and how this invention contributes to the solution of such prior-art problems.

"Kick-back" means that the outgoing run of the cutting chain is jammed, caught or otherwise encounters resistance thereby causing the cutter bar mounting such cutting chain to be thrown back towards the human operator's face, neck or chest with consequent serious injury or even death. For example, a right-handed human operator grasps and holds the chain saw with his left hand holding a cross-wise, gripping front handle and his right hand holding a rear control handle aligned with the front to rear longitudinal axis of such chain saw. When "kick-back" occurs, the human operator's left hand, holding such cross-wise front handle, rotates or moves forward on such front handle. The object of this invention is to utilize this physical fact of the movement of the human operator's hand holding such front handle when "kick-back" occurs to shut off the engine and stop the cutting chain.

The object of this invention is to contribute to the solution of such prior-art problems by providing an elongated safety handle of open-cylindrical configuration that is rotatively mounted by the existing front handle. The safety handle is operatively connected to the existing on-off switch to shut off the engine and stop the cutting chain when kick-back occurs. The safety handle has an "on" position and and "off" position. The safety handle must be rotated to its "on" position and the existing on-off switch must be switched on before the chain saw can be started. The human operator grasps and holds the safety handle during normal operation and running of the chain saw and he can shut off the engine and stop the cutting chain by simply rotating the safety handle forward in a clockwise direction. When kick-back occurs, the cutter bar will be thrown back toward the human operator; and, since such kickback occurs while he is still grasping and holding the safety handle, the safety handle will automatically be rotated forward in a clockwise direction to independently actuate the on-off switch to shut off the engine and stop the cutting chain.

The safety handle of this invention requires the human operator to place his chain saw on the ground before starting same. If he attempts to start his chain saw while holding same off the ground, the torquing engine will cause the cutter bar to rotate counterclockwise and the human operator's hand grasping the safety handle will again automatically rotate the safety handle clockwise shutting off the engine and stopping the cutting chain.

During severe kick-back or throw, or when the chain saw is dropped, the human operator's hand will not be grasping and holding the safety handle but instead his hand will strike a wrist guide operatively connected with the safety handle to cause it to rotate clockwise to shut off the engine.

This invention also features an automatic reset mechanism for the handle. The safety handle is biased by a compression spring to its "on" position. Rotation of such safety handle to its "off" position imposes a compressive bias upon such spring whose restoring force, upon relief from such compressive bias, automatically rotates and restores the safety handle to its "on" position.

SUMMARY OF THE INVENTION

In accordance with the invention, there is provided a safety handle of open-cylindrical configuration that is rotatively mounted by the existing front handle of the chain saw and is operatively connected to the chain saw's on-off switch to independently actuate such on-off switch to shut off the engine and stop the cutting chain upon rotation of the safety handle either automatically when kick-back occurs or by the human operator at his option. There is also provided a wrist guide operatively connected to such safety handle to effect rotation of such safety handle to shut off the engine and stop the cutting chain as a result of the human operator's hand striking such wrist guide during severe kick-back or when the chain saw is dropped. There is also provided an automatic reset mechanism that maintains the safety handle in its "on" position and restores it to its "on" position after it has been rotated to its "off" position and released.

BRIEF DESCRIPTION OF THE DRAWINGS

This object and other objects of the invention should be discerned and appreciated by reference to the drawings, wherein like reference numerals refer to similar parts throughout the several views, in which:

FIG. 1 is an isometric view of the typical chain saw, from the right rear quarter, showing the safety handle rotatively mounted on the front handle and operatively connected by sheated cable and linkage to the on-off switch on the rear handle;

FIG. 2 is an exploded view of the safety handle mounted on the front handle, the wrist guide carried on such safety handle, the sheave portion of the safety handle mounting the cable and the split collar mounting the safety handle;

FIG. 3 is a cut-a-way view of the assembled safety handle showing the spring-loaded ball detent and the cable mounted in the sheave portion of the safety handle;

FIG. 4 is an isometric view of the chain saw's trunnion-mounted on-off switch in its "off" position in relation to the dashed lines representing the surface of the rear handle, and the operatively connected cable and linkage;

FIG. 5a is an isometric view showing the on-off switch in its "on" position with phantom lines indicating the previous "off" position;

FIG. 5b shows the position of the human operator's left hand, the safety handle and wrist guide with the pointer on such safety handle being aligned with the "on" notch on the split collar;

FIG. 5c is a cross-sectional view taken in the direction of the arrows 5c—5c in FIG. 5b, and shows the ball detent, compression spring and adjusting screw relative to the ball-detent housing, the ball detent engaged with the "on" recess position, and the cable mounted in the sheave of the safety handle;

FIG. 6a is an isometric view showing the on-off switch in its "off" position with phantom lines indicating its previous "on" position;

FIG. 6b shows the position of the human operator's left hand, the safety handle and the wrist guide with the pointer on such safety handle being aligned with the "off" notch on the split collar;

FIG. 6c is a cross-sectional view taken in the direction of the arrows 6c—6c in FIG. 6b and shows the ball detent engaged with the "off" recess position;

DESCRIPTION OF THE PREFERRED EMBODIMENT

Figure 7:
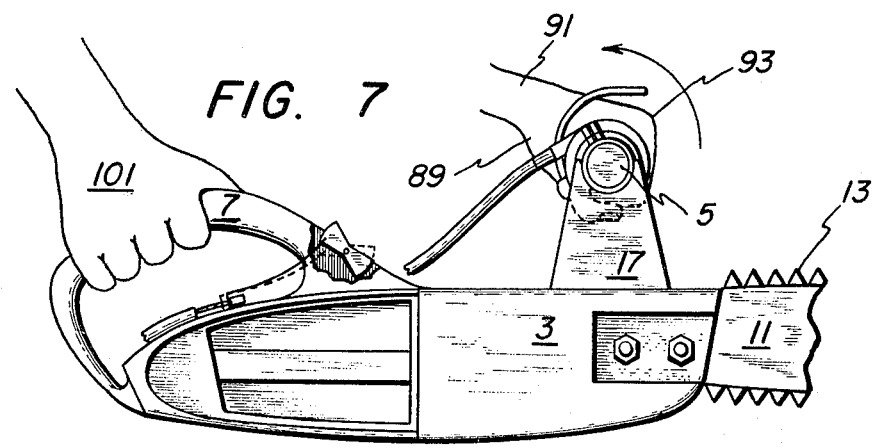
FIG. 7 is a right side elevation of the chain saw with the human operator's hands in normal operating position and the on-off switch in its "on" position.

To facilitate understanding of the invention, a nomenclature list is herewith provided:
1 generally refers to the invention,
3 housing,
5 cross-wise, gripping front handle,
7 rear control handle
9 starting rope,
11 cutter bar,
13 cutting chain on cutter bar 11,
15 on-off switch trunnion-mounted in rear handle 7,
17 pedestal mount fixed to housing 3,
19 safety handle of open-cylindrical configuration,
21 shoulder portion of safety handle 19,
23 cable sheave portion of safety handle 19,
25 split collar freely mounting sheave portion 23,
27 upper half of split collar 25,
29 lower half of split collar 25,
31 cap screw mounting upper and lower collar halves 27 and 29, together,
33 locking screw,
35 recess in surface of cable sheave portion 23,
37 ball detent,
39 ball-detent housing,
41 tapped hole in lower collar half 29,
43 adjusting screw engaged with tapped hole 41,
45 compression spring,
47 sheath freely receiving cable 51,
49 clamp mounting sheath 47 on housing 3,
51 cable,
53 threaded ferrule at one end of sheath 47,
55 tapped hole in sheath housing 57,
57 sheath housing integral with lower-collar half 29,
59 sheave in cable sheave portion 23,
61 hole in cable sheave portion 23,
63 plug fixed to one end of cable 51 in transverse relationship thereto,
65 plug carried in concentric relationship on cable 51,
67 "on" element of switch 15,
69 "off" element of switch 15,
71 end of linkage,
73 linkage,
75 close-loop end or eye of linkage 73,
77 L-shaped wrist guide,
79 long leg of guide 77,
81 curved short leg of guide 77,
83 clamp on safety handle 19,
85 pintle post of clamp 83,
87 set screw engaged with pintle post 85,
89 left hand of human operator,
91 wrist of left hand 89,
93 knuckles of left hand 89,
95 pointer on shoulder portion 21,
97 "on" notch on split collar 25,
99 "off" notch on split collar 25,
101 right hand of human operator,
103 return housing of lower collar half 29,
105 tapped hole in return housing 103,
107 spring adjusting screw engaged with tapped hole 105,
109 hole communication with tapped hole 105,
111 compression spring in hole 109,
113 slot in cable sheave portion 23,
115 shoulder in slot 113.

In FIG. 1 of the drawings, reference numeral 1 generally refers to the invention of the chain saw safety switch.

The conventional chain saw shown comprises a housing 3, cross-wise, gripping front handle 5, rear control handle 7, starting rope 9, cutter bar 11, cutting chain 13 and pivotable on-off switch 15.

Switch 15 is conventionally trunnion-mounted (not shown) in rear handle 7 and is operatively connected via linkage (not shown) to short out the magneto and stop the engine and drive sprocket thereby stopping the cutting chain 13. Front handle 5, curved as shown, has one end fixed to and transversely disposed by means of a pedestal mount 17 fixed to housing 3.

Front handle 5 freely carries thereon and rotatively mounts an elongated safety handle 19 of open-cylindrical configuration. Safety handle 19 has a shoulder portion 21 and defines on its end a cable sheave portion 23 freely mounted by means of a split collar 25. Split collar 25 has an upper half 27 and a lower half 29 assembled in fixed relationship by means of cap screws 31 engaged with tapped holes (not shown) formed in the lower half 29. Split collar 25 has a left portion of greater diameter than its right portion; and which right portion receives front handle 5 and is affixed to handle 5 by means of a locking screw 33 engaged in locking relationship with handle 5 via a tapped hole (not shown) provided in lower half 29.

Complemental recesses 35, formed in the surface of cable sheave portion 23 of safety handle 19, are engageable by an adjustable ball detent 37 to removably lock the safety handle 19 in corresponding "on" and "off" positions of rotation. The lower-collar half 29 has an integral ball-detent housing 39 whose tapped hole 41 is engaged by an adjusting screw 43. A compression spring 45 is interposed between the distal end of adjusting screw 43 and ball detent 37. Appropriate adjustment of screw 43 correspondingly loads ball detent 37.

A sheath 47, mounted on housing 3 by means of clamps 49, freely receives in reciprocable relationship therein a cable 51. One end of sheath 47 has a threaded ferrule 53 engaged with a tapped hole 55 formed in a sheath housing 57 integral with lower-collar half 29.

Cable sheave portion 23 defines a sheave 59 upon which is trained cable 51. A complemental hole 61 in transverse relationship with cable sheave portion 23 removably mounts a plug 63 fixed to and in transverse relationship with one end of cable 51. The other end of cable 51 fixedly carries on its end a plug 65 in concentric relationship.

Switch 15 has a manipulative "on" element 67 and a manipulative "off" element 69. "Off" element 69 operatively carries an end 71 of a linkage 73 and its other end 75 is in the form of a closed loop or eye receiving in operative relationship cable 51 and plug 65. Upon appropriate reciprocation of cable 51, plug 65 will operatively engage closed-loop end 75 of linkage 73 thereby pivoting "off" element 69 downwardly to short out the magneto and stopping the engine and drive sprocket and hence cutting chain 13.

An L-shaped wrist guide 77 has a long leg 79 and a curved short leg 81. Wrist guide 77 is operatively and adjustably mounted relative to safety handle 19 by means of a clamp 83 having a pintle post 85. Pintle post 85 has a transverse hole therethrough complementally receiving short leg 81 whose relative position is adjustably fixed by means of a set screw 87 engaging short leg 81 via a tapped hole (not shown) formed in pintle post 85 and communicating with such pintle-post hole.

Figure 8:
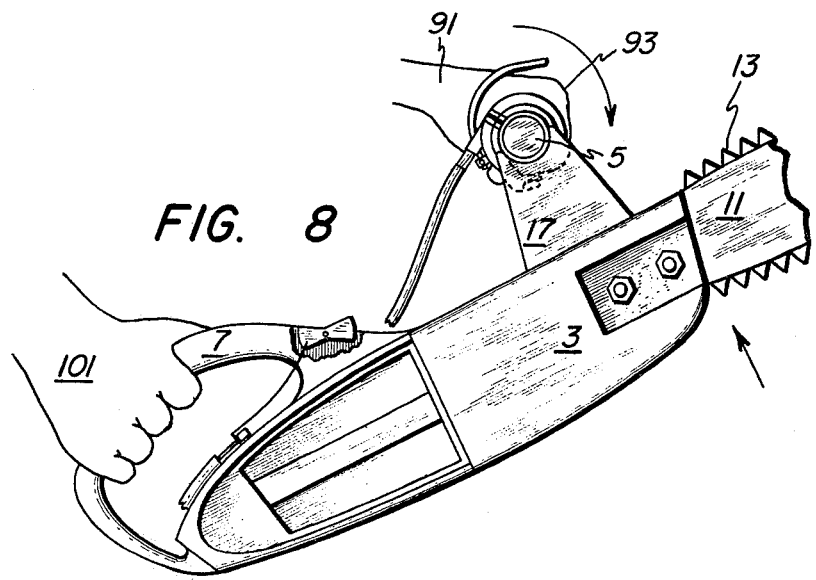
FIG. 8 is a right side elevation of the chain saw in a "kick-back" position and shows the human operator's left hand rotated clockwise and the on-off switch in its "off" position.

FIGS. 1 and 4 show on-off switch 15 in its "off" position. In the operation of the chain saw, such on-off switch 15 is appropriately manipulated to dispose on-off switch 15 in its "on" position, as shown in FIG. 5a with close-loop end or eye 75 of the linkage 73 abutting plug 65. The chain saw is conventionally started and operated by the human operator, as shown in FIG. 7. When "kick-back" occurs, the safety handle 19 being grasped by the human operator is rotated clockwise, as shown in FIG. 8, causing cable 51 and plug 65 to be reciprocated in the direction of the cutter bar 11. Since the linkage eye 75 was already abutting plug 65, such further movement of cable 51 and plug 65 causes the linkage 73 to be moved backwards disposing on-off switch 15 in its "off" position, as shown in FIG. 6a. It should be noted that the human operator can shut off the chain saw at any time, including during normal operation, by simply rotating the safety handle 19 in a clockwise direction to its "off" position.

The purpose of the wrist guide 77 is to cause the safety handle 19 to rotate to its "off" position thus shutting off the engine and stopping the cutting chain 13 if the human operator's left hand 89 comes free of the safety handle 19 in the event of a severe kick-back or throw of the cutter bar 11, or if the human operator should drop his chain saw. In such event, the human operator's left hand 89 or wrist 91 will strike long leg 79 of the wrist guide 77 causing the wrist 91 to move forward and rotate clockwise effecting the same movement of the safety handle 19 because physically the human operator's left hand 89 is located relative to the wrist guide 77 such that the long leg 79 is between his knuckles 93 and his wrist 91. Adjustment of the wrist guide 77 relative to safety handle 19 is effected by appropriate disposition of the clamp 83, and of short leg 81 relative to pintle post 85.

It should be noted that the L-shaped wrist guide 77 will cause the saftey handle 19 to rotate clockwise to shut off the engine whether the dropped chain saw, in being dropped, rotates clockwise, does not rotate, or rotates counter-clockwise. When the dropped chain saw rotates clockwise, the long leg 79 of the wrist guide 77 will move from its position relative to the proximal phalanges of the human operator's left hand 89 to his distal phalanges with his fingers striking long leg 79 and thereby causing the safety handle 19 to rotate clockwise shutting off the engine. When the dropped chain saw does not rotate, long leg 79 will strike the proximal phalanges of the human operator's left hand 89 thereby causing the safety handle to rotate clockwise shutting off the engine. When the dropped chain saw rotates counter-clockwise, the long leg 79 will move from its position relative to the proximal phalanges of the human operator's left hand 89 towards his wrist 91 with the long leg 79 striking either the back of left hand 89, his wrist 91 or the lowermost part of his arm thereby causing the safety handle 19 to rotate clockwise shutting off the engine.

FIG. 5b shows the position of the left hand 89, wrist guide 77 and safety handle 19 in the "on" position as indicated by the alignment of the pointer 95 on shoulder portion 21 of safety handle 19 with the corresponding "on" notch 97 on the split collar 25.

FIG. 6b shows the position of the left hand 89, wrist guide 77 and safety handle 19 in the "off" position as indicated by the alignment of such pointer 95 with the corresponding "off" notch 99 on split collar 25.

Figure 9:
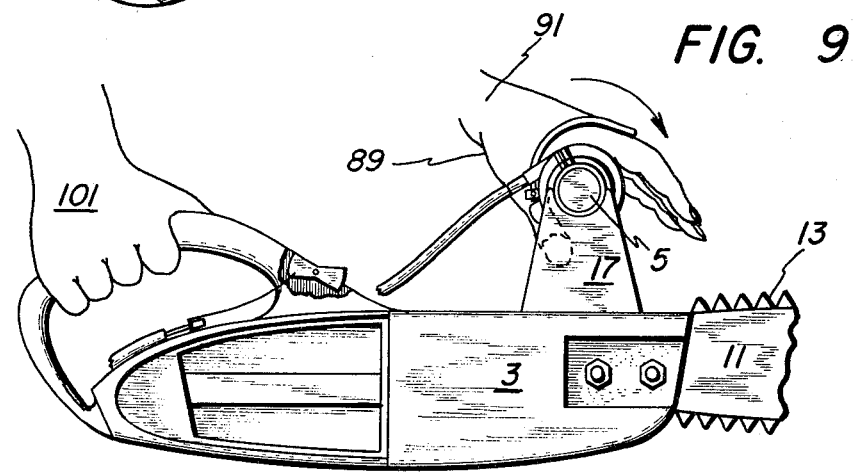
FIG. 9 is a right side elevation of the chain saw in a "dropping" position and shows the human operator's left hand striking the wrist guide causing the safety handle to rotate to its "off" position thereby actuating the on-off switch to its "off" position.

FIG. 9 shows the chain saw in a "dropping" position with the human operator's left hand 89 striking wrist guide 77 causing the safety handle 19 to rotate clockwise to the "off" position shutting off the engine and stopping the cutting chain 13.

The fact that the human operator grasps and holds the safety handle 19 throughout the cutting operation of the chain saw means that the human operator will maintain instant control at all times over such chain saw and can shut off the engine and stop the cutting chain 13 by simply rotating safety handle 19 clockwise. Hence, if the human operator realizes or anticipates that a kick-back or jump of the chain saw may occur, he can immediately stop the cutting chain 13 by clockwise rotation of the safety handle 19.

It is a common practice of some chain saw operators to start their chain saws by holding same off the ground. In such deplored practice, a chain saw operator holds his chain saw off the ground with his left hand 89 on the conventional front handle 5 and pulls the starting rope 9 with his right hand 101. Serious injury results from the engine torquing with the chain saw rotating upwardly in the operator's left hand 89 and striking him with the cutting chain 13 when the engine starts. Although such starting technique is strictly against all manufacturers' prescribed safety procedures, nevertheless it is followed quite often. This invention requires the human operator to place his chain on the ground in the proper starting position with firm control of the chain saw in order to start same. In the human operator attempts to start his chain saw while holding his chain saw off the ground, what happens is the physical fact that the cutter bar 11 would start to rotate counterclockwise toward the human operator's chest, neck and face, and at the same time his left hand 89, grasping safety handle 19, would rotate clockwise immediately "killing" the engine before it had a chance to start or "killing" the engine and stopping the cutting chain 13 if the engine started.

Figure 10A:
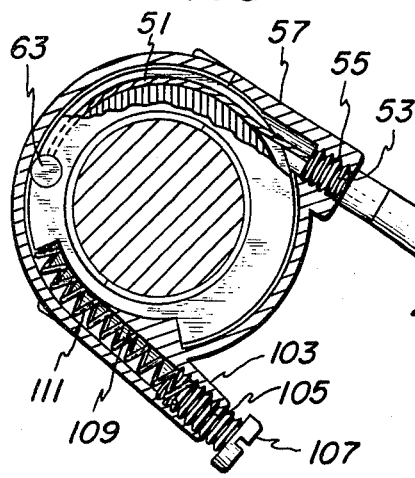
FIG. 10a is a cross-sectional view similar to FIG. 5c, and shows the alternate embodiment of the automatic reset mechanism without the loaded ball-detent mechanism and shows the safety handle in its "on" position.
Figure 10B:
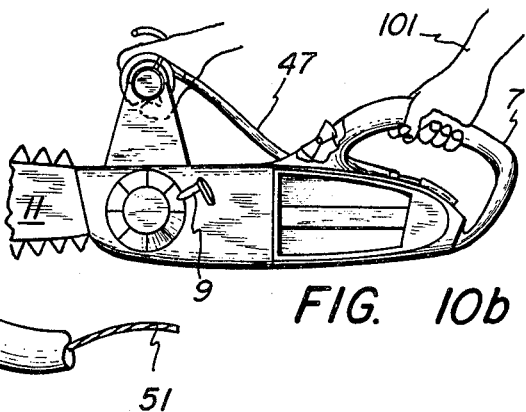
FIG. 10b is a left side elevation of the chain saw showing the normal operating position of the human operator's hands.
Figure 11B:
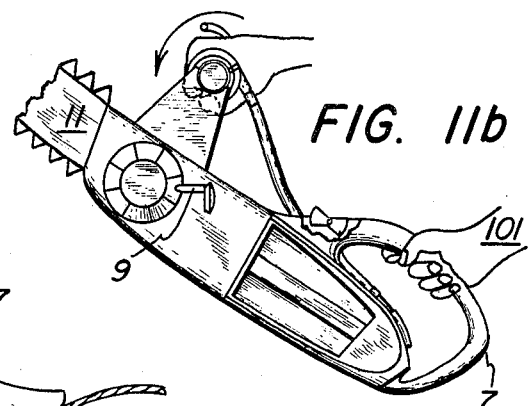
FIG. 11b is a left elevation of the chain saw in kick-back position and shows the human operator's left hand.
Figure 11A:
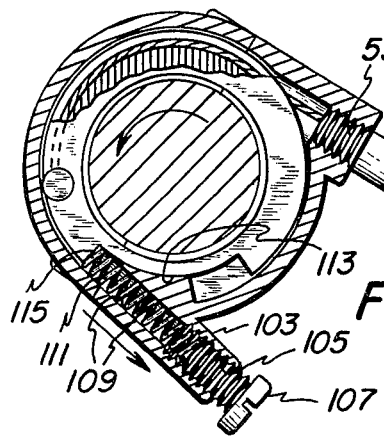
FIG. 11a is a cross-sectional view similar to FIG. 10a, and shows the safety handle in its "off" position with compressive bias inposed on the spring of the automatic reset mechanism with the safety handle rotated to such "off" position either at the human operator's option or as a result of kick-back.
Figure 12B:
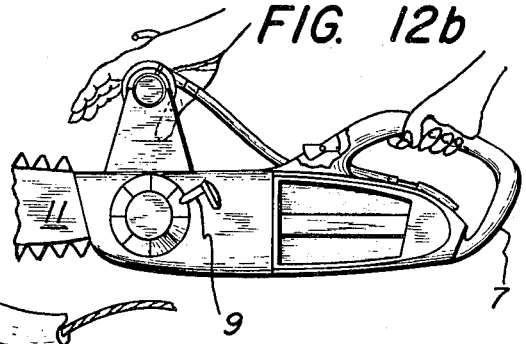
FIG. 12b is a left elevation of the chain saw showing the human operator's left hand released from the safety handle with the safety handle returned to its "on" position.
Figure 12A:
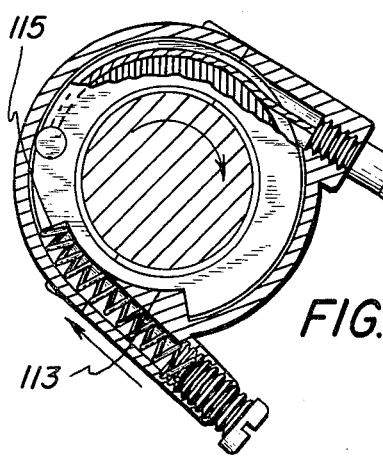
FIG. 12a is similar to FIG. 10a and shows the restoring force of the spring relieved of compressive bias to return the safety handle to its "on" position.

FIGS. 10a, 11a and 12a show an automatic reset mechanism as an alternate embodiment of cable sheave portion 23 of safety handle 19 and the lower half 29 of split collar 25. The lower collar half 29 has an integral return housing 103 whose tapped hole 105 is engaged by a spring adjusting screw 107. Tapped hole 105 communicates with a concentric hole 109 that mounts a compression spring 111 interposed between the distal end of adjusting screw 107 and a slot 113 formed in cable sheave portion 23. Spring 111 abuts a shoulder 115 in slot 113.

FIG. 10a shows the normal operating position of compression spring 111 engaged with the shoulder 115 in slot 113 to dispose the safety handle 19 in its "on" position.

FIGS. 11a and 11b show a kick-back condition with the grasped safety handle 19 rotated clockwise to its "off" position (counterclockwise as viewed in FIG. 11b) and the shoulder 115 in slot 113 compressing spring 111. FIGS. 11a and 11b similarly would illustrate the condition when the human operator elected to rotate the safety handle 19 to shut off the engine.

FIGS. 12a and 12b show the human operator's left hand 89 released from safety handle 19 with the safety handle 19 rotated counterclockwise to its "on" position (clockwise as viewed in FIG. 12a) by virtue of the restoring force of compression spring 111.

It should be discerned and appreciated with reference to all of the foregoing description that notwithstanding the safety handle 19 being in its "on" position, being rotated to its "on" position or being rotated to its "on" position by virtue of restoring force of compression spring 111, in order to start the engine the "on" element 67 of the manual on-off switch 15 must be appropriately manipulated in every instance to additionally dispose switch 15 in its "on" position.

It further should be discerned and appreciated that when the automatic reset mechanism (structurally embodied in integral return housing 103, adjusting screw 107 and compression spring 111) is utilized, the loaded ball-detent mechanism (structurally embodied in complemental recesses 35, ball detent 37, ball-detent housing 39, adjusting screw 43 and compression spring 45) is not.

Having thusly described my invention, I claim:

1. In a chain saw having a front handle and an on-off switch controlling drive means driving a cutting chain, a safety switch means rotatively operable in one direction to an "off" position to independently actuate via actuating means said on-off switch to its own "off" position to stop said drive means driving said cutting chain, said safety switch means being grasped and held by a hand of a human operator during the entire operation of said chain saw and, while so grasped and held, automatically rotating said safety switch means in such one direction to said "off" position when "kick-back" occurs, said safety switch means being rotatable at any time by said human operator at his option to dispose said safety switch means in its said "off" position, said front handle freely carrying thereon and rotatively mounting said safety switch means, and said actuating means operatively connecting said safety switch means with said on-off switch to actuate said on-off switch to its own said "off" position to stop said drive means driving said cutting chain upon such rotation of said safety switch means in such one direction to its said "off" position.

2. A device as defined in claim 1, wherein said actuating means comprises cable and linkage, said cable being operatively connected to said safety switch means, said linkage being operatively connected to said on-off switch, and wherein said cable is operatively connected to said linkage to effect movement of said linkage to dispose said on-off switch in its own said "off" position.

3. A device as defined in claim 1, wherein said safety switch means comprises an elongated safety handle of open-cylindrical configuration and wherein said front handle freely carries thereon said elongated safety handle.

4. A device as defined in claim 1, wherein said safety switch means comprises detent means and recesses, and wherein said detent means is engageable with said recesses to releasably lock said safety switch means in corresponding "on" and "off" positions.

5. A device as defined in claim 1, wherein said safety switch means comprises a safety handle and a collar, wherein said collar is fixed to said front handle and freely mounts said safety handle, wherein said safety handle is grasped by the human operator, and wherein said actuating means operatively connects said safety handle with said on-off switch to actuate said on-off switch to its own said "off" position.

6. A device as defined in claim 5, wherein said safety handle has "on" and "off" positions corresponding to discrete positions of rotation of said safety handle, wherein said collar operatively carries a spring, wherein said spring engages a shoulder in said safety handle to dispose and maintain said safety handle in its corresponding "on" position of rotation, wherein sufficient opposite rotation of said safety handle disposes said safety handle in its "off" position and compresses said spring, and wherein when said spring is relieved from compressive bias the restoring force of said spring causes said safety handle to rotate and return to its said "on" position.

7. A device as defined in claim 5, wherein said safety handle has "on" and "off" positions corresponding to discrete positions of rotation of said safety handle, wherein said collar has detent means and said safety handle has recesses corresponding to said "on" and "off" positions of rotation of said safety handle, and wherein said detent means is engageable with said recesses to releasably lock said safety handle in said corresponding "on" and "off" positions of rotation.

8. A device as defined in claim 1, wherein said safety switch means comprises a safety handle grasped by the human operator and a wrist guide, wherein said actuating means operatively connects said safety handle with said on-off switch to actuate said on-off switch to its own said "off" position and wherein said wrist guide is operatively connected to said safety handle to cause said safety handle to rotate to its "off" position upon the human operator's losing his grasp on said safety handle, striking said wrist guide with his hand and thereby causing rotation of said safety handle in the event of severe kick-back or upon the human operator's dropping his chain saw.

9. A device as defined in claim 8, wherein said wrist guide is operatively connected to said safety handle by means of a clamp, and wherein said clamp affords adjustable disposition of said wrist guide relative to said safety handle.

* * * * *